US012671166B2

(12) United States Patent
Pudenz

(10) Patent No.: US 12,671,166 B2
(45) Date of Patent: Jun. 30, 2026

(54) ANTENNA FOR AN RFID READING DEVICE WITH POLARIZATION SWITCHING

(71) Applicant: SICK AG, Waldkirch (DE)

(72) Inventor: Florian Pudenz, Waldkirch (DE)

(73) Assignee: SICK AG, Waldkirch (DE)

( * ) Notice: Subject to any disclaimer, the term of this patent is extended or adjusted under 35 U.S.C. 154(b) by 110 days.

(21) Appl. No.: 18/653,654

(22) Filed: May 2, 2024

(65) Prior Publication Data

US 2024/0372244 A1 Nov. 7, 2024

(51) Int. Cl.
*H01Q 1/22* (2006.01)
*G06K 7/10* (2006.01)
*H01Q 9/04* (2006.01)

(52) U.S. Cl.
CPC ....... *H01Q 1/2216* (2013.01); *G06K 7/10316* (2013.01); *H01Q 9/0435* (2013.01)

(58) Field of Classification Search
CPC ............. G06K 7/10316; H01Q 1/2216; H01Q 21/245; H01Q 9/0428; H01Q 9/0435; H01Q 9/045
See application file for complete search history.

(56) References Cited

U.S. PATENT DOCUMENTS 6,839,036 B1 * 1/2005 Apostolos .............. H01Q 21/24
343/770
7,068,224 B2 6/2006 Carrender et al.
7,932,867 B2 4/2011 Tuttle 2005/0078043 A1 * 4/2005 Apostolos .............. H01Q 13/10
343/770
2011/0032079 A1 2/2011 Bloy et al.
2016/0226124 A1 * 8/2016 Fasenfest ................ H01P 5/185
2024/0120664 A1 * 4/2024 Morimoto ........... H01Q 21/062
2024/0178566 A1 * 5/2024 Casazzone .......... H01Q 21/065
2024/0319334 A1 * 9/2024 Lee ........................ G01S 7/4091
2024/0329199 A1 * 10/2024 Lee ........................ G01S 13/536
(Continued)

FOREIGN PATENT DOCUMENTS

CN 201435450 * 8/2001 ................ H01P 5/12
CN 201435450 Y * 8/2016 ................ H01P 5/12
(Continued)

OTHER PUBLICATIONS

Search Report dated Oct. 9, 2023 issued in corresponding European Application No. 23171296.9.

*Primary Examiner* — Thien M Le
(74) *Attorney, Agent, or Firm* — Nath, Goldberg & Meyer; Jerald L. Meyer

(57) ABSTRACT

An antenna for an RFID reading device is provided, wherein the antenna has an antenna element having four feed points and has a feed network that is configured to selectively connect an input signal to the feed points such that the antenna is operated with a circular polarization or a linear polarization. In this respect, the feed network has a switch arrangement in which different switch states are settable, with the feed network feeding the feed points with different phases and/or power portions of the input signal in a respective switch state; and has switch states for at least three of the four polarizations horizontal-linear polarization, vertical-linear polarization, clockwise circular polarization, and counterclockwise circular polarization are settable in the switch arrangement.

23 Claims, 5 Drawing Sheets

(56)     References Cited

U.S. PATENT DOCUMENTS

Figures 1, 2:
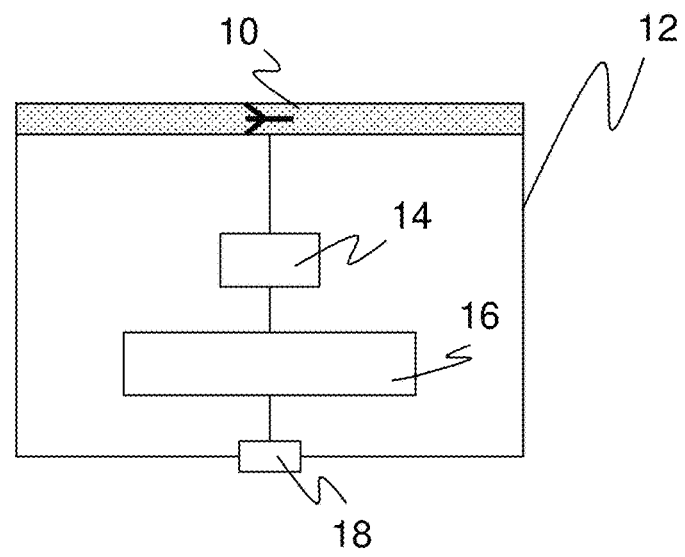

2025/0202118 A1 *   6/2025  Chiang  ................. H01Q 21/24
2025/0239779 A1 *   7/2025  Chen  ................... H01Q 21/205

FOREIGN PATENT DOCUMENTS

| | | | |
|---|---|---|---|
| DE | 202015106025 | U1 | 1/2016 |
| DE | 202015105455 | U1 | 3/2016 |
| EP | 2368210 | A1 | 6/2010 |
| EP | 2368210 | B1 | 12/2012 |
| EP | 3220554 | A1 | 9/2017 |
| EP | 1987468 | B1 | 5/2018 |
| KR | 10-0902496 | B1 | 6/2009 |
| KR | 10-2010-0006948 | A | 7/2010 |
| KR | 10-0976087 | B1 | 8/2010 |
| KR | 10-1868464 | B1 | 6/2018 |

* cited by examiner

Figure 3

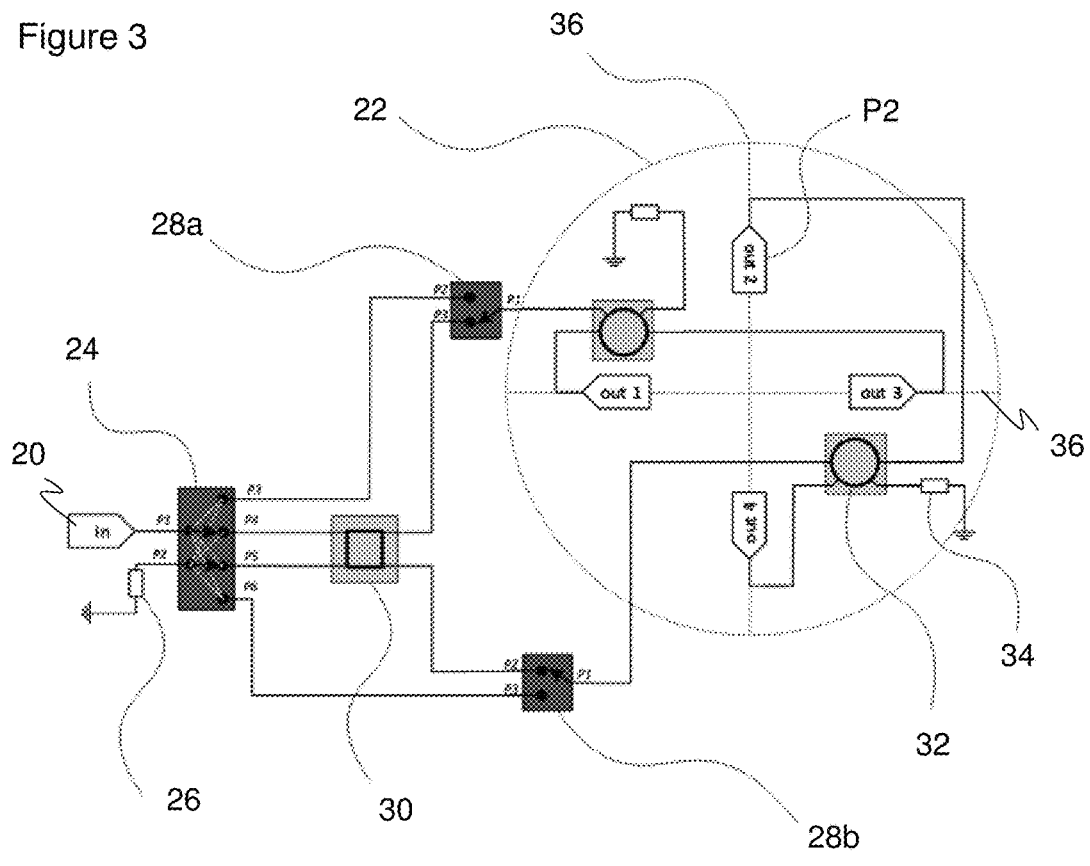

Figure 4

| Polarization | DP4T state | SPDT O1 state | SPDT O2 state | Signal on out1 | Signal on out2 | Signal on out3 | Signal on out4 |
|---|---|---|---|---|---|---|---|
| Circular 1 | P1=>P4, P2=>P5 | P1 => P3 | P1 => P2 | Pin - 6dB - Ln, 0deg | Pin - 6dB - Ln, -90deg | Pin - 6dB - Ln, -180deg | Pin - 6dB - Ln, -270deg |
| Circular 2 | P1=>P5, P2=>P4 | P1 => P3 | P1 => P2 | Pin - 6dB - Ln, -270deg | Pin - 6dB - Ln, -180deg | Pin ~ 6dB - Ln, -90deg | Pin - 6dB - Ln, 0deg |
| Linear 1 | P1=>P3, P2=>P6 | P1 => P2 | P1 => P3 | Pin-3dB-Ln, 0deg | 0 | Pin-3dB-Ln, -180deg | 0 |
| Linear 2 | P1=>P6, P2=>P3 | P1 => P2 | P1 => P3 | | Pin-3dB-Ln, -180deg | | Pin-3dB-Ln, 0deg |
| Open 1 | P1=>P3, P2=>P6 | P1 => P3 | P1 => P2 | 0 | 0 | 0 | 0 |
| Open 2 | P1=>P6, P2=>P3 | P1 => P3 | P1 => P2 | 0 | 0 | 0 | 0 |

ANTENNA FOR AN RFID READING DEVICE WITH POLARIZATION SWITCHING

The invention relates to an antenna for an RFID reading device and to a method of switching the polarization of an antenna.

RFID reading device serve for the identification of objects and products and are used inter alia to automate logistical movements. RFID transponders fastened to the products are read at an identification point, above all on a change of the owner of the product or on a change of the transport means, and information is optionally written back into the transponder. The detected information is used to control the forwarding and sorting of goods and products. Important applications for automatic identification are logistics distribution centers, for instance of parcel shippers, or the baggage check-in at airports.

The RFID reading device excites RFID transponders located in its reading range by electromagnetic radiation via its antenna to emit the stored information, receives the corresponding transponder signals and evaluates them. For this purpose, the UHF (ultra-high frequency) range is frequently used since there is an established framework here in the standard ISO 18000-6 and in addition transponders at different distances from some millimeters up to several meters can be read. UHF RFID transponders are available in very compact construction designs and can also accordingly be attached to very small objects.

In a number of applications, the orientation of the RFID transponder with respect to the RFID reading device is not fixed or is at least not known. It is then an advantage for the range and reading rate to use a circularly polarized antenna to compensate a variation in the orientation of the RFID transponders. Since most RFID transponders use a linearly polarized antenna, only half of the received energy is taken up in the best case, however. A linearly polarized antenna of a suitable orientation is therefore to be preferred in applications having a fixed orientation of the RFID transponder since the RFID transponder can then take up considerably more energy, whereby the identification range increases accordingly. The use of an RFID reading device having a different polarization can therefore be considered depending on the application case.

DE 20 2015 106 025 U1 discloses an RFID antenna arrangement for the reception and transmission of electromagnetic waves of different polarization. The antenna has two feed points in its basic form. The switching effort is thus already in particular high for the control of the mixer used and there are relatively large losses in the feed network. However, favorable antenna properties are only achieved with four feed points, in particular with respect to the axial ratio, that provide robustness with respect to interference by metallic objects in the direct environment of the antenna, for example. A switching variant for four feed points is admittedly also presented in DE 20 2015 106 025 U1. It is, however, based on a doubling of the feed network for two feed points whereby said disadvantages even substantially intensify again.

Methods for changing the change of the antenna polarization are described in U.S. Pat. No. 7,932,867 B2. A plurality of antennas are provided for this purpose that are used selectively and this substantially increases the construction effort and the required construction space.

U.S. Pat. No. 7,068,224 B2 discloses a patch antenna that can be switched between vertical and linear polarizations. There is thus a lack of an option of circular polarization.

An antenna switch arrangement is known from US 2011/0032079 A1 having an arrangement of feed lines by which a signal path can be selected in that connections are switched to ground. A signal having linear or circular polarization is thereby produced at the two output ports. It is not possible in this manner to generate circular polarization of both directions of rotation.

An antenna arrangement in accordance with EP 3 220 554 A1 can switch between different polarizations, but uses a respective one horizontal-linearly polarized and one vertical-linearly polarized antenna for this purpose. The feed network could moreover not be used for four feed points.

KR 10 0976087 B1 discloses a further antenna arrangement for the selective generation of linear and circular polarization. The feed network used admittedly controls four feed points, but is not able to compensate misalignments that arise at the patch antenna.

An antenna network in accordance with EP 2 368 210 B1 is able to operate an antenna in a circularly or elliptically polarized manner such that it is alternatively polarized as counterclockwise and clockwise. A linear polarization is, however, not possible here.

An RFID multiplexer that distributes an RFID signal to different antennas is described in EP 1 987 468 B1. There is no possibility here of generating different polarizations within an antenna.

DE 20 2015 105 455 U1 presents a conductor structure for an RFID signal that is composed of straight-line line sections on the edges of a hexagonal pattern. The document does not deal with the switching of polarizations.

The still unpublished European patent application having the reference number 22188151.9 discloses a method of manufacturing a modular antenna for an RFID device. A polarization control logic is mentioned therein, but is not explained in any more detail.

It is therefore the object of the invention to further improve an antenna having switchable polarization.

This object is satisfied by an antenna for an RFID reading device and by a method of switching the polarization of an antenna in accordance with the respective independent claim. The antenna has an antenna element by which a signal is irradiated or received. Four feed points are provided on the antenna element. A feed network connects an input signal to the feed points such that an antenna is selectively produced having circular or linear polarization. All the feed points or only a partial selection thereof are/is fed depending on the polarization state.

The invention starts from the basic idea of setting different switch states in the feed network by means of a switch arrangement. The switch states respectively correspond to a polarization. Overall, four polarizations are of interest for an RFID reading device, namely horizontal-linear polarization, vertical-linear polarization, clockwise circular polarization, and counterclockwise circular polarization. The feed network makes switch states possible for at least three of these four polarizations. Provision is made in the respective switch state that the feed points are each fed by a signal of a phase derived from the input signal and powers from which the selected polarization results overall. This can mean that no signal should be applied for some polarizations and feed points. The feed network can therefore output different power levels having mutually different phase angles at different outputs, with the powers and phases generating the associated polarization via the feed points at the antenna element depending on the switch state.

The invention has the advantage that an operation of the antenna is made possible with a polarization respectively optimum for the application situation and the RFID transponders to be read. The feed network in accordance with the invention is able to couple the input signal into the four feed points with particularly small losses. The lower the losses for the signal distribution and forwarding in turn are, the higher the antenna gain. This even has a dual effect with RFID antennas because the same antenna is used for transmission operation and reception operation. The reading rate and the range thus increase overall.

The feed points are preferably arranged symmetrically, in particular in a square. This provides particularly favorable antenna properties and polarization properties and a clear, simple design.

The switch arrangement preferably has a first switch element and a second switch element having a plurality of connection lines therebetween, in particular four connection lines. Sufficient flexibility to generate the different polarizations is produced with even less complexity by a two-stage switch structure.

A 90° hybrid coupler is provided between the first switch element and the second switch element in the connection lines, in particular in two of the connection lines. The 90° hybrid coupler can thus be selectively integrated in the feed depending on the switch state. A 90° phase is in particular used for the circular polarizations. With a linear polarization, the connection lines having the 90° hybrid conductor can be bypassed by an associated switch state, which results in a better adaptation of the antenna.

The first switch element preferably has at least one port for the input signal at the input side and four ports on an output side toward the antenna element. The first switch element thus provides the input signal in a switchable manner at one of our outputs with the four outputs preferably being connected to the four connection lines. This is a 1:4 association in an embodiment. The first switch element on the input side particularly preferably has a further port that is connected to an antenna termination. This then produces an embodiment having a 2:4 association. The integrated antenna termination provides a considerably improved antenna adaptation.

The first switch element is preferably formed as a four-way switch, in particular as a DP4T (double pole quadruple throw) or as a combination of two-way switches, in particular of a DPDT (double pole double throw) having two downstream SPDTs (single pole double throws). They are specific simple switch components that are suitable for a 2.4 association. The input signal and an antenna termination are preferably connected at the input side; the four connection lines to the second switch element at the output side.

The first switch element preferably has one port for the input signal at the input side and three ports on an output side toward the antenna element, with the 90° hybrid coupler being fixedly connected to an antenna termination. This corresponds to a 1:3 association and is suitable for an embodiment that only allows three polarizations to be selected, namely the two linear polarizations and a circular polarization whose direction of rotation is fixed by the feed network. The antenna termination is here fixedly associated with the switch state in which the 90° hybrid coupler is integrated so that no two ports are required at the input side. The direction of rotation of the circular polarization can be selected in a technical switching manner by the side on which the 90° hybrid coupler is connected to the first switch element or to the antenna termination; a switchover here results in a reversal of the direction of rotation. A specific exemplary switch module for this embodiment is an SP3T (single pole triple throw).

The first switch element preferably has additional ports for a further antenna element on the output side. A 1:n association where n>4 is required for this such as n=8 for the connection of a further antenna having four selectable polarizations. This can be achieved, for example, by the combination of an upstream 2:2 switch (DPDT) and of two four-way switches (SP4T).

The second switch element preferably has two two-way switches by which in particular respectively selectively one of two connection lines to the antenna element can be switched through. The two two-way switches, in particular SPDTs, are in particular connected pairwise at the input side to the four connection lines of the first switch element so that a pair of connection lines in a respective 2:1 association is switched to a line of the two-way switches at the output side directed to the feed points. In this respect, the respective pair is preferably formed by a direct connection line of the first switch element and a connection line led over the 90° hybrid coupler. It must be noted that there is also a fourth connection lines, namely that of the antenna termination to the 90° hybrid coupler, in said embodiment having a first switch element having a 1:3 association.

The feed network preferably has two 180° power dividers of which the one 180° power divider is connected to two feed points and the other 180° power divider is connected to the remaining two feed points to feed the respective two connected feed points with partial signals of the input signal having a phase offset of 180°. The 180° power dividers divide the incoming signal and conduct the partial signals having a respective 180° phase offset to their associated feed points. The two pairs of feed points preferably form the diagonals in the arrangement of the feed points. A respective 180° power divider is preferably connected to one of the two-way switches of the second switch element.

The 180° power dividers are preferably formed as hybrid ring couplers (ratrace hybrids). This is a proven and suitable switching element to generate two partial signals having mutual 180° phase offsets from one signal. Alternatively, the 180° power dividers are formed as Wilkinson power dividers or as T power dividers. The 180° phase offset is then in particular generated by means of a delay line for one of the partial signals in the connection between the Wilkinson power divider or T power divider and the feed point.

The feed network is preferably formed without vias. This is possible due to the skillful geometrical arrangement, in particular using the line structure based on hexagonal honeycombs in accordance with DE 20 2015 105 455 U1 named in the introduction. A feed network without vias can in turn be manufactured in a single layer; no change of the circuit board layer or printed circuit board layer is required for this. This produces a particularly inexpensive component that is simple to handle.

The antenna preferably has a circuit board on whose one surface the antenna element is arranged and on whose other surface the feed network is arranged. This produces a particularly compact design. This is particularly favorable with a feed network without vias in accordance with the previous paragraph. A simple circuit board is then sufficient; no complex multilayer design is required. The antenna element is here preferably formed as an antenna patch since such a patch can likewise be applied as flat and in one layer. A very compact patch antenna is produced having good antenna properties and the possibility of choosing between up to four polarizations.

In a preferred further development, an RFID reading device has an antenna in accordance with the invention, a transceiver connected to the antenna, and an RFID control and evaluation unit connected to the transceiver. The antenna can here be operated as an internal or external antenna of the RFID reading device. The antenna is used by the RFID reading device to transmit RFID signals to an RFID transponder and/or to receive RFID signals from an RFID transponder. Any combination of a transmitter and receiver is called a transceiver here. The RFID control and evaluation unit that has at least one digital processing module such as a microprocessor, an FPGA (field programmable gate array), an ASIC (application specific integrated circuit), or the like is configured for the encoding of RFID information into the RFID signals and/or for reading RFID information from the RFID signals. The transceiver and the RFID control and evaluation unit can form a common processing module or can at least partially use a processing module together. Such an RFID reading device is preferably used in a stationary installation at a reading zone of a conveyor or of a reading portal for reading at least one RFID transponder moved on the conveyor or through the reading portal. Depending on the application situation, a suitable polarization can be set and it can also be changed dynamically in operation.

The method in accordance with the invention can be further developed in a similar manner and shows similar advantages in so doing. Such advantageous features are described in an exemplary, but not exclusive manner in the subordinate claims dependent on the independent claims.

Figure 5:
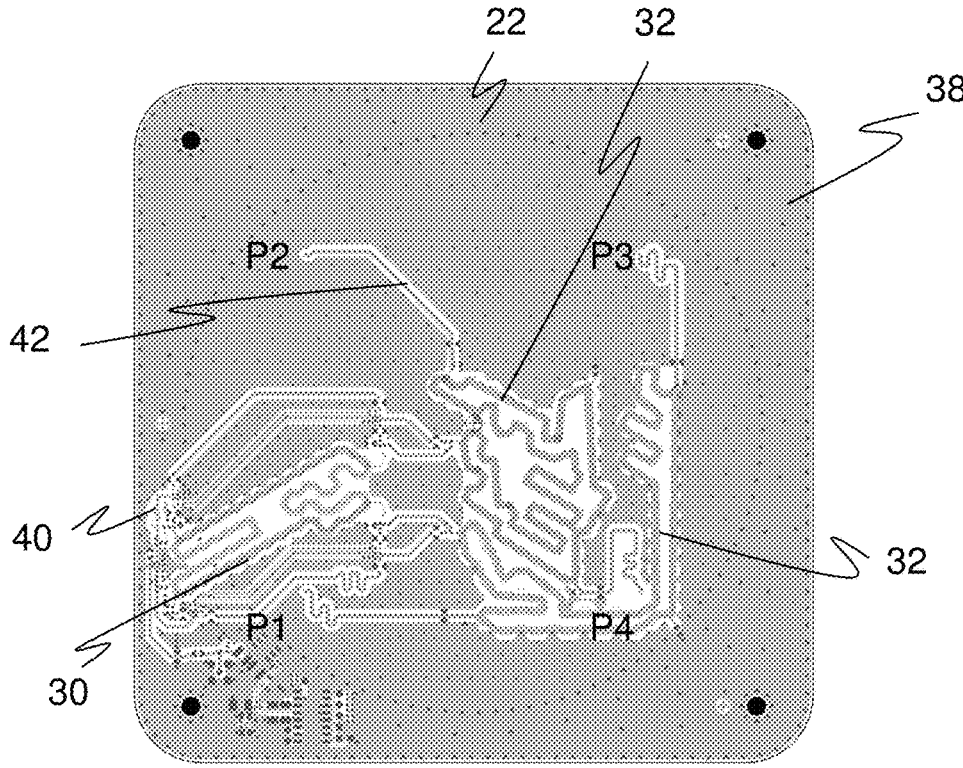
Figure 6:
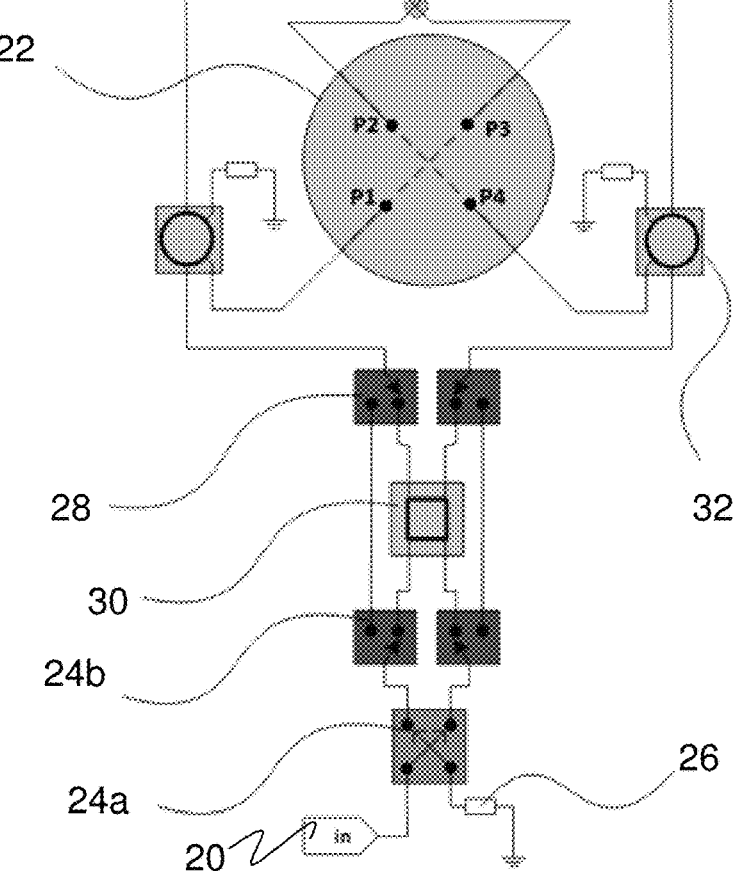
Figure 7:
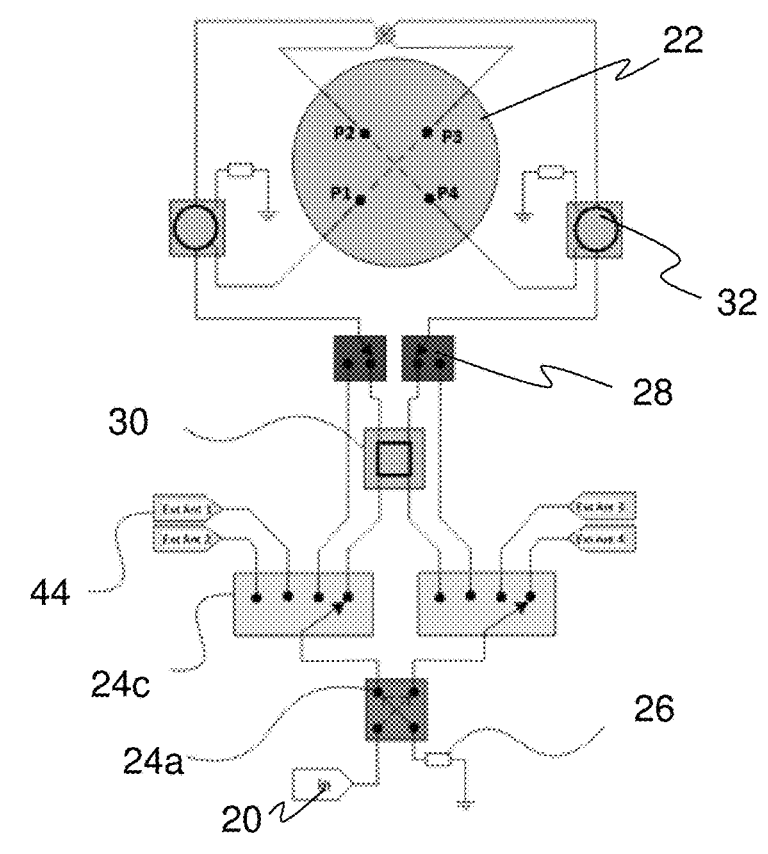
Figure 8:
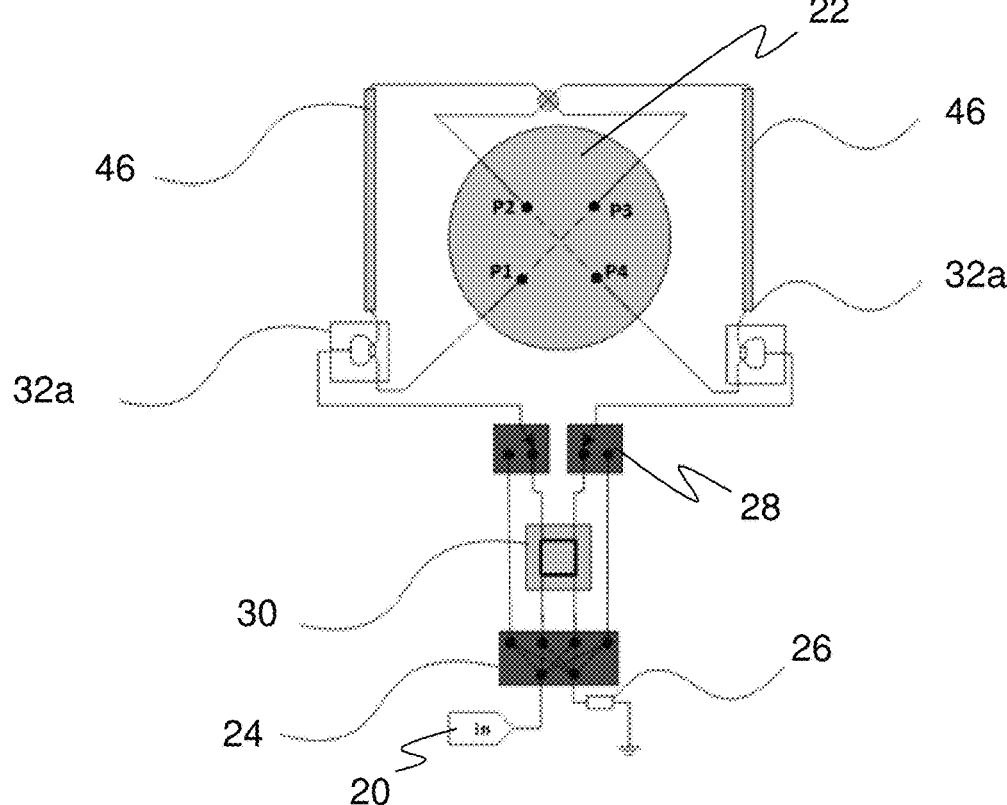
Figure 9:
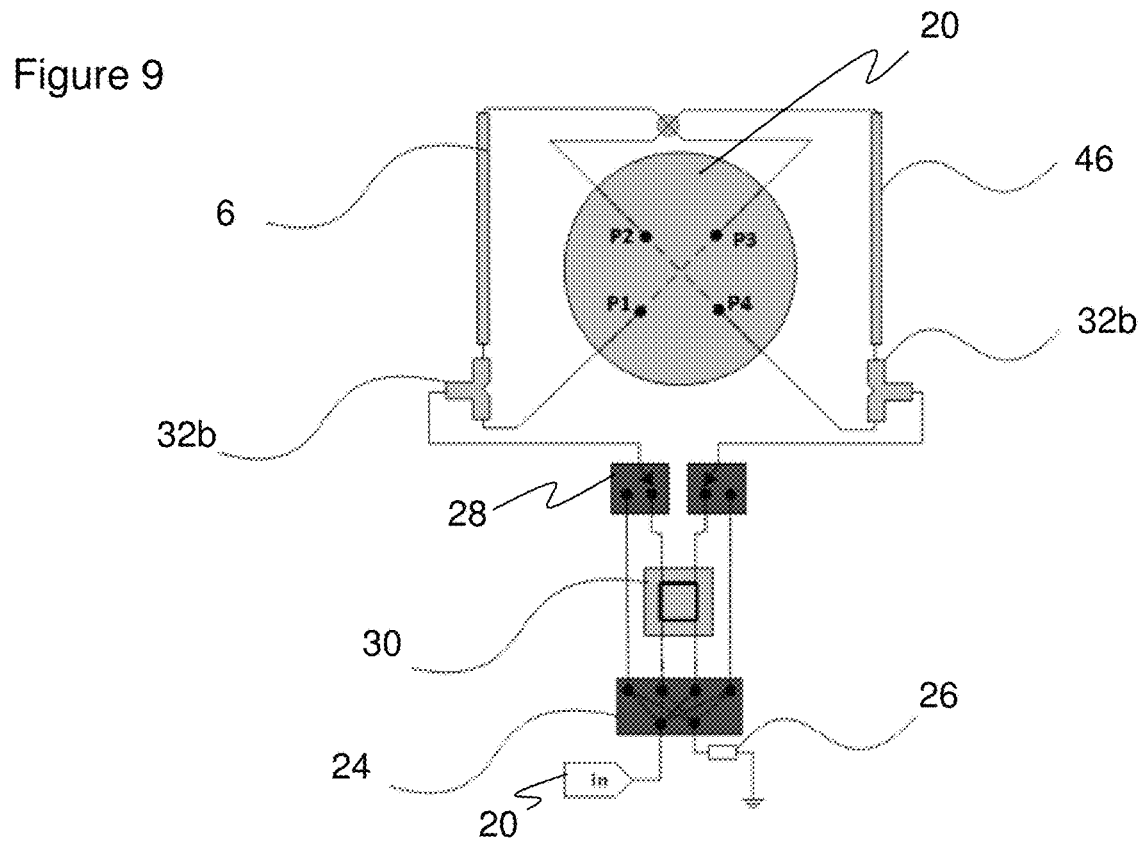
Figure 10:
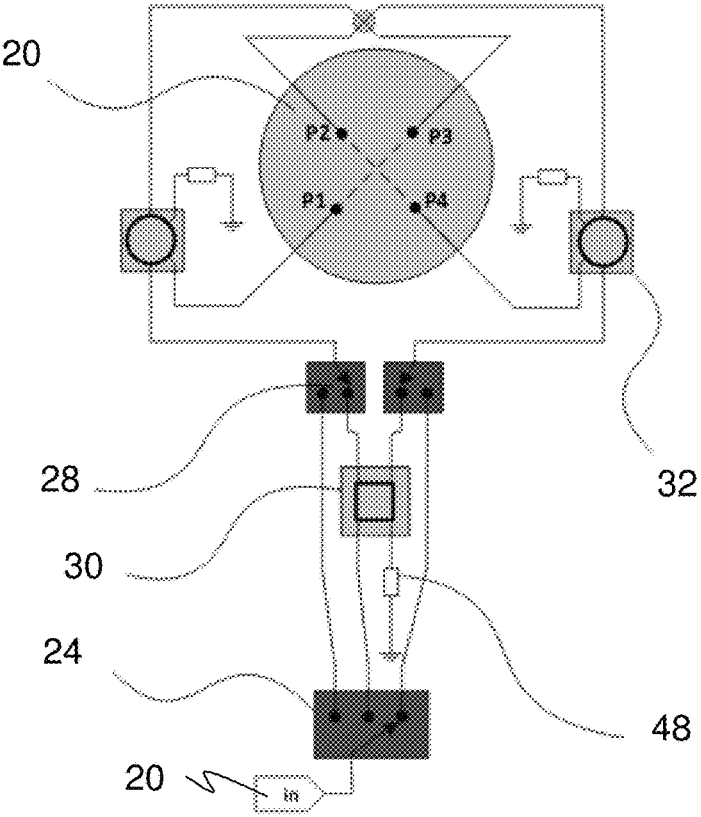

The invention will be explained in more detail in the following also with respect to further features and advantages by way of example with reference to embodiments and to the enclosed drawing. The Figures of the drawing show in:

FIG. 1 a schematic representation of an RFID reading device with an antenna;

FIG. 2 a schematic representation of a feed network for four feed points and four polarizations;

FIG. 3 an alternative representation of the feed network in accordance with FIG. 2;

FIG. 4 a table with polarizations and associated switch states of the feed network;

FIG. 5 an exemplary layout of the feed network;

FIG. 6 a schematic representation of a further embodiment of the feed network with one DPDT and two SPDTs instead of a DP4T at the input side;

FIG. 7 a schematic representation of a further embodiment of the feed network having additional ports for a further antenna;

FIG. 8 a schematic representation of a further embodiment of the feed network with Wilkinson power dividers and 180° delay lines instead of ring couplers;

FIG. 9 a schematic representation of a further embodiment of the feed network having T power dividers instead of Wilkinson power dividers; and FIG. 10 a schematic representation of a further embodiment in which the feed network only supports a circular polarization.

FIG. 1 shows a schematic representation of an antenna 10 in an RFID reading device 12. The antenna 10 is designed for the ISM band at approximately 900 MHz, for example. A transceiver 14 is connected to the antenna 10 and a control and evaluation unit 16 of the RFID reading device 12 is connected to it to evaluate RFID signals received by means of the antenna 10 or to transmit information to a transponder as RFID signals. The control and evaluation unit 16 is furthermore connected to a wired or wireless interface 18 to exchange data, to carry out parameterizations, and the like.

The mode of operation of an RFID reading device, for example for the UHF frequency range (ultrahigh frequency) in accordance with the standard IS 18000-6, is known per se and will therefore not be explained in more detail The invention relates to the antenna 10 or to its feed network such as subsequently described in detail with reference to the further FIGS. 2 to 10. An external antenna is also conceivable instead of the internal antenna 10 shown, with then the transceiver 14 and control and evaluation unit 16 being accommodated in at least one further housing separate from the antenna 10 and connected via a cable.

FIG. 2 shows a schematic representation of a feed network for the antenna 10. The feed network has the function of dividing the input signal 20 and of coupling it into an antenna element 22 with suitable power levels and phases at four feed points P1 . . . P4 so that an antenna 10 having a desired polarization is produced overall. The antenna element 22 is preferably an antenna patch so that a patch antenna is produced. Depending on the switch state, a horizontal-linear polarization, a vertical-linear polarization, a clockwise circular polarization, and a counterclockwise circular polarization, that is four polarizations, are possible with the feed network shown. An embodiment of the feed network presented below with reference to FIG. 10 only permits a circular polarization and thus three polarizations.

The feed network has a first switch element 24, in the example shown a four-way switch having two ports (DP4T, double pole quadruple throw) at the input side by which the input signal 20 is distributed over four ports. An antenna termination 26 is provided at the second port at the input side. A second switch element 28 that has two single pole two-way switches (single pole double throws, SPDTs), for example, is arranged downstream of the first switch element 24. Four connection lines from the four ports of the first switch element 24 at the output side to the second switch element 38 are connected pairwise to the ports of the single pole two-way switches at the input side. A 90° hybrid coupler 30 (branchline hybrid, 90°, 3 dB divider) is connected in a respective one connection line of each pair. At the output of the second switch element 28, two 180° power dividers 32 are connected; in this embodiment as ring couplers (ratrace hybrids, 180°, 3 dB dividers), that each per se again has a termination 34. Each of the two partial signals from the two single pole two-way switches of the second switch element 28 are thereby again divided and the partial signals produced are supplied to the feed points P1, P3 or P2, P4 with an 180° phase offset.

FIG. 3 shows an alternative representation of the feed network in accordance with FIG. 2. In the region of the antenna element 22, its axes of symmetry 36 are drawn with respect to which the feed points P1 . . . . P4 are also arranged symmetrically, preferably in the form of a centered square. With a symmetrical distribution of the feed points, a phase offset of 90° is required for a circular polarization or of 180° for a linear polarization as is provided by the feed network. A differing, asymmetrical arrangement is possible, but then needs a corresponding adaptation of the phases or only approximately reaches the respectively desired polarization.

FIG. 4 shows a table with polarizations and associated switch states of the feed network. The different polarizations are entered in the first column. The variants "Open 1" and "Open 2" are special cases that are not required for the actual operation of the antenna 10. The express wiring of the input signal 20 to an open line end or to a line end short circuited to ground can be used, for example, for a reference measurement or for a calibration to characterize the distance between the RFID front end having the transceiver 14 and the feed network, for instance to determine the line damping with offset antennas with a longer cable.

The second column shows how the ports P1, P3 of the first switch element 24 at the input side are connected to its ports P3 . . . P6 at the output side for a respective polarization state of the first column. The switch state of the two single pole two-way switches 28a-b of the second switch element 28 is correspondingly shown in the third and fourth columns. It must be noted that the designations Px are used multiple times for ports of different switch elements and also the feed points, but what the designation refers to can be clearly seen from the respective context. The rear four columns list the signals arriving at the feed points P1 . . . . P4, with the feed points being designated by out1 . . . out4 in the table as already in FIG. 3. Pin here means the respective input power.

As an example, the first circular polarization in accordance with the first line of the table is achieved in that the first switch element 24 establishes a connection to the inner connection lines by the 90° hybrid coupler via P4 and P5, while the second switch element 28 leads these inner connection lines over P3 of the first single pole two-way switch 28a and P2 of the second single pole two-way switch 28b to the 180° power dividers 32. The two partial signals at the output of the second switch element 28 are thus phase offset from one another by 90° and the 180° power dividers thereby generate a 0° partial signal for the feed point P1, a 90° partial signal for P2, a 180° partial signal for P3, and a 270° partial signal for P4.

The antenna 10 makes possible a circular polarization having a small axial ratio by its four feed points. The antenna 10 thereby becomes more robust toward interference from the outside, in particular metallic objects or reflectors close to the antenna 10. Respective partial signals having a phase offset of 180° can be coupled in at two feed points for the generation of a linear polarization. The damping is small at all polarizations. With a linear polarization, the 90° hybrid coupler 30 is bypassed so that the damping can even remain smaller than with a circular polarization.

FIG. 5 shows an exemplary specific layout of the feed network on a printed circuit board or circuit board 38 that is shown schematically in FIG. 3. The antenna element 22 can be recognized in an indicative manner on the rear side of the circuit board 38. The structures of the 90° hybrid coupler 30 as well as those of the two 180° power dividers 32 utilize a conductor structure on an hexagonal pattern in accordance with DE 20 2015 105 455 U1 named in the introduction. They are connected by connections implemented as impedance-adapted microstrip lines 40. At the outputs of the two 180° power dividers 32, connection lines 42 lead to the feed points P1 to P4 whose symmetrical arrangement can be recognized even better in the associated schematic representation of FIG. 3.

The special feature of the feed network shown comprises it being able to be implemented in a single copper layer. The feed network manages without any vias of the lines and thus without any change of the printed circuit board layer and components required for line vias, particularly since corresponding vias for an impedance adaptation would require special attention with respect to damping and phase shift. The complexity is thus reduced by a single layer layout of the feed network as in FIG. 5 and costs can be saved and nevertheless particularly good antenna properties and polarization properties can be achieved. A particularly compact design of the antenna 10 is produced when the feed network is arranged on the one side or surface of the circuit board 38 (lower side), in particular in one layer, and the antenna element 22 is arranged on the other side or surface (upper side), in particular in the form of an antenna patch. Such a design, that can be easily integrated, also easily enables a modular variant formation for different housings as has been described in the still unpublished European patent application having the reference number 22188151.9 named in the introduction.

FIG. 6 shows a schematic representation of a further embodiment of the feed network. Unlike the previously described embodiments, the first switch element here is configured as a consecutive arrangement of a double pole two-way switch (double pole double throw, DPDT) 24a having two single pole two-way switches (single pole double throws, SPDT) 24b. A double port four-way switch (double port quadruple throw, DP4T) can thus be mapped and replaced.

FIG. 7 shows a schematic representation of a further embodiment of the feed network. Unlike the previously described embodiments, the first switch element here provides additional ports 44 for a further antenna, not shown, in different switchable polarizations. For this purpose, two four-way switches (SP4T) are arranged downstream of a double pole two-way switch (DPDT) by way of example here. There are thus a total of eight ports at the outputs of the first switch element of which four ports can be used as previously for the generation of the four polarizations of the antenna 10 and four further ports 44 can be used for a further antenna.

FIG. 8 shows a schematic representation of a further embodiment of the feed network. Unlike the previous embodiments, the 180° power dividers 32 are here no longer configured as hybrid ring couplers, but rather as Wilkinson power dividers 32a. The 180° phase offset is achieved by means of delay lines of a suitable delay. A Schiffmann phase shifter would alternatively be conceivable to enable a power division at a suitable phase offset over a larger frequency range of the feed network. A 3 dB 180° power division is thus likewise possible based on the Wilkinson power divider 32a. The advantage with respect to ring couplers comprises a smaller passage damping with a correct dimensioning. On the other hand, the insulation between the output ports is admittedly smaller, but this plays a subordinate role for the design of the antenna 10 since the signals should be coupled to the same antenna element 22 and since there is in particular anyway a relatively good coupling between two oppositely disposed feed points there on a design as an antenna patch.

FIG. 9 again shows an alternative to FIG. 8 in which now the Wilkinson power dividers 32a have been replaced with T power dividers 32b. Otherwise reference is made to the explanations on FIG. 8. The selection of suitable 180° power dividers 32, 32a, 32b is possible in all embodiments; it is not limited to the specific representations of FIGS. 8 and 9.

FIG. 10 shows a schematic representation of a further embodiment in which the feed network only supports one circular polarization and not both circular polarizations of both directions of rotation. A single pole three-way switch (single pole triple throw, SP3T) is used as the first switch element 24 here. Only a connection to the 90° hybrid coupler 30 is switchable; its other port is fixedly connected to an antenna adaptation 48. The direction of rotation of the circular polarization is here only selectable by switch design. The feed network in accordance with FIG. 10 thus only allows the selection between three polarizations and has the advantage here of generating smaller losses due to the reduced number of switches or due to a simpler design of the switch components.

The invention claimed is:

1. An antenna for an RFID reading device, wherein the antenna has an antenna element having four feed points and has a feed network that is configured to selectively connect an input signal to the feed points such that the antenna is operated with a circular polarization or a linear polarization, wherein the feed network has a switch arrangement in which different switch states are settable, with the feed network feeding the feed points with different phases and/or power portions of the input signal in a respective switch state; and wherein switch states for at least three of the four polarizations horizontal-linear polarization, vertical-linear polarization, clockwise circular polarization, and counterclockwise circular polarization are settable in the switch arrangement, wherein the feed points are arranged symmetrically, and wherein the feed network has two 180° power dividers of which the one 180° power divider is connected to two feed points and the other 180° power divider is connected to the remaining two feed points to feed the respective two connected feed points with partial signals of the input signal phase offset by 180°.

2. The antenna in accordance with claim 1,
wherein the feed points are arranged in a square.

3. The antenna in accordance with claim 1,
wherein the switch arrangement has a first switch element and a second switch element having a plurality of connection lines therebetween.

4. The antenna in accordance with claim 3,
wherein the first switch element and the second switch element have four connection lines therebetween.

5. The antenna in accordance with claim 3,
wherein a 90° hybrid coupler is provided between the first switch element and the second switch element in the connection lines.

6. The antenna in accordance with claim 5,
wherein the 90° hybrid coupler is provided in two of the connection lines.

7. The antenna in accordance with claim 3,
wherein the first switch element has at least one port for the input signal on an input side and four ports on an output side toward the antenna element.

8. The antenna in accordance with claim 7,
wherein the first switch element has a further port on the input side that is connected to an antenna termination.

9. The antenna in accordance with claim 7,
wherein the first switch element is configured as a double port four-way switch, or as a combination of two-way switches.

10. The antenna in accordance with claim 7,
wherein the first switch element is configured as a DPDT having two downstream SPDTs.

11. The antenna in accordance with claim 3,
wherein the first switch element has one port for the input signal at the input side and three ports on an output side toward the antenna element, with the 90° hybrid coupler being fixedly connected to an antenna termination.

12. The antenna in accordance with claim 11,
wherein the first switch element is configured as an SP3T.

13. The antenna in accordance with claim 3,
wherein the first switch element has additional ports for a further antenna element on the output side.

14. The antenna in accordance with claim 3,
wherein the second switch element has two two-way switches.

15. The antenna in accordance with claim 14,
wherein selectively one of two connection lines to the antenna element can be switched respectively through by the two two-way switches.

16. The antenna in accordance with claim 1,
wherein a respective 180° power divider is connected to a two-way switch of the second switch element.

17. The antenna in accordance with claim 1,
wherein the 180° power dividers are formed as hybrid ring couplers.

18. The antenna in accordance with claim 1,
wherein the 180° power dividers are configured as Wilkinson power dividers or T power dividers each having a delay line in the connection between the Wilkinson power divider or the T power divider and the feed point that generates a 180° phase offset.

19. The antenna in accordance with claim 1,
wherein the feed network is formed without vias.

20. The antenna in accordance with claim 1,
that has a circuit board on whose one surface of the antenna element is arranged and on whose other surface the feed network is arranged.

21. The antenna in accordance with claim 20,
wherein the antenna element is configured as an antenna patch.

22. An RFID reading device having an antenna with a transceiver connected to the antenna, and an RFID control and evaluation unit connected to the transceiver, wherein the antenna has an antenna element having four feed points and has a feed network that is configured to selectively connect an input signal to the feed points such that the antenna is operated with a circular polarization or a linear polarization, wherein the feed network has a switch arrangement in which different switch states are settable, with the feed network feeding the feed points with different phases and/or power portions of the input signal in a respective switch state; and wherein switch states for at least three of the four polarizations horizontal-linear polarization, vertical-linear polarization, clockwise circular polarization, and counterclockwise circular polarization are settable in the switch arrangement, wherein the feed points are arranged symmetrically, and wherein the feed network has two 180° power dividers of which the one 180° power divider is connected to two feed points and the other 180° power divider is connected to the remaining two feed points to feed the respective two connected feed points with partial signals of the input signal phase offset by 180°.

23. A method of switching the polarization of an antenna for an RFID reading device, wherein the antenna has an antenna element having four feed points, wherein an input signal is selectively connected to the feed points in different manners with the aid of a feed network of the antenna such that the antenna is operated with a circular polarization or a linear polarization, wherein a switch arrangement of the feed network in which switch states for at least three of the four polarizations horizontal-linear polarization, vertical-linear polarization, clockwise circular polarization, and counterclockwise circular polarization are settable is switched into a switch state corresponding to a selected polarization so that the feed points are fed with phases and/or power portions of the input signal for the selected polarization, wherein the feed points are arranged symmetrically, and wherein the feed network has two 180° power dividers of which the one 180° power divider is connected to two feed points and the other 180° power divider is connected to the remaining two feed points to feed the respective two connected feed points with partial signals of the input signal phase offset by 180°.

* * * * *